Dec. 15, 1931.            J. M. SHIMER            1,836,776
                            STUFFING BOX
                         Filed May 22, 1926
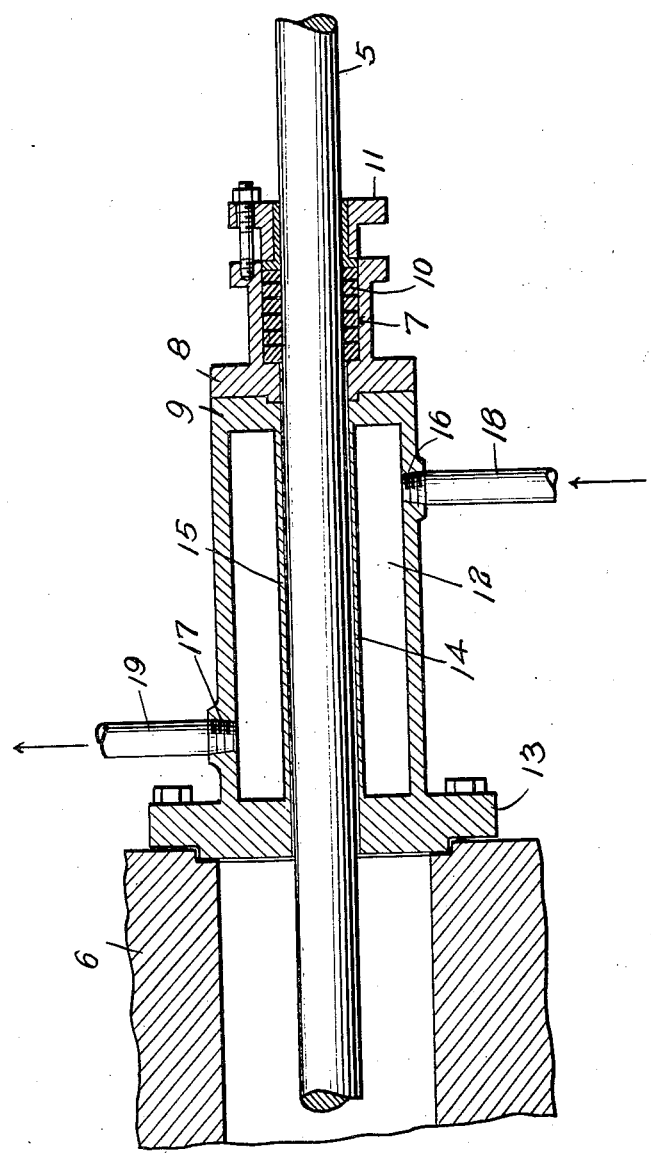
WITNESSES
INVENTOR Patented Dec. 15, 1931

1,836,776

UNITED STATES PATENT OFFICE

JOHN M. SHIMER, OF WILKINSBURG, PENNSYLVANIA, ASSIGNOR TO WILSON-SNYDER MANUFACTURING COMPANY, A CORPORATION OF PENNSYLVANIA

STUFFING BOX

Application filed May 22, 1926. Serial No. 111,013.

This invention relates to stuffing boxes and more particularly to those adapted for use with apparatus for handling fluids at high temperature.

Wherever such fluids are handled as, for example, in the petroleum cracking industry where oil at 800° F. is circulated, it is essential to provide a stuffing box capable of resisting the effects of such temperatures for long periods of time.

An object of this invention is to provide a device of the type set forth of such construction and arrangement that the high temperature of the fluid being handled by the associated apparatus will have no deleterious effect upon the device.

A further object is to provide a stuffing box of such construction that if any leakage takes place it will be of relatively cool fluid which will not constitute a fire hazard.

These and other objects which are apparent to those skilled in this particular art are accomplished by means of this invention, one embodiment of which is shown in the accompanying drawing, which is a sectional view through a stuffing box constructed in accordance with one form of this invention and shown in operative association with the piston rod of a pump.

The particular embodiment of the invention which has been chosen for the purposes of illustration is shown in the drawing as operatively associated with the piston rod 5 of a hot oil pump 6 and includes a recess 7 formed in a block 8 on the outer end of the stuffing box 9. A soft packing 10 is mounted in the recess and pressure is applied thereto by an ordinary gland 11. The soft packing is spaced a distance from the pump cylinder greater than the stroke of the piston rod 5 so that that part of the rod which contacts with the hot oil within the pump cylinder will never enter the packing.

An annular chamber 12 is formed in the stuffing box between the packing and the flange 13 by means of which the stuffing box is secured in operative relation to the pump. A relatively thin wall 14 surrounds the piston rod so as to separate the chamber 12 therefrom and an annular space 15 of very small dimension is provided between the piston rod and the inner surface of the surrounding wall 14. The chamber 12 forms, in effect, a second annular space and is provided with an inlet 16 and an outlet 17 connected to a supply line 18 and a discharge line 19, respectively, by means of which a cooling fluid is caused to flow through the annular space formed by the closed chamber 12.

The cooling medium is passed through the stuffing box at a sufficient velocity to prevent the temperature increasing to a point higher than would be satisfactory for efficient operation. The hot oil from the pump cylinder enters the annular space 15 around the piston rod and lubricates the same while the cooling fluid removes the heat therefrom to permit the packing 10 to work at a normal temperature so that there is no deterioration of the packing caused by the high temperature of the fluid being pumped. The hot oil which enters the narrow annular space 15 and lubricates the piston rod is so cooled by the fluid flowing through the surrounding annular space within the stuffing box that any leakage through the packing, if any should develop, will be of such a relatively low temperature as not to constitute a fire hazard.

Although I have described a specific form of this invention it is apparent that various changes, omissions, substitutions and additions can be made therein without departing from the spirit of the invention or the scope of the appended claims. What I claim as new and desire to secure by Letters Patent is:

1. The combination with a hot oil pump of a stuffing-box for the piston-rod thereof having a relatively-thin imperforate heat-transmitting wall surrounding the piston-rod and spaced therefrom so as to provide an annular channel surrounding said rod and opening into the associated pump-chamber to receive hot oil therefrom for lubricating said rod, a closed chamber surrounding said wall for the circulation of a cooling fluid therethrough, a fluid-inlet and a fluid-outlet associated with said chamber, and a packing for said rod mounted on the end of said stuffing-box spaced from the pump.

2. The combination with a hot oil pump of a stuffing-box for the piston-rod thereof having spaced walls defining a chamber for the circulation of a cooling fluid therethrough, one of said walls being thin, imperforate, substantially parallel to the piston-rod, and spaced slightly therefrom so as to provide an annular channel surrounding said rod and opening into the associated pump chamber to receive hot oil therefrom for lubricating said rod, a fluid-inlet and a fluid-outlet associated with said cooling chamber, and a packing for said rod mounted on the end of said stuffing-box spaced from the pump.

3. The combination with a hot oil pump of a stuffing-box for the piston-rod thereof comprising a packing for said rod, a cooling box surrounding the piston-rod and disposed between the packing and the pump-chamber, said cooling box having a thin imperforate wall substantially parallel to the piston-rod and spaced slightly therefrom so as to provide an annular channel surrounding said rod and opening into the associated pump chamber to receive hot oil therefrom for lubricating said rod, a fluid-inlet and a fluid-outlet associated with said cooling box.

In testimony whereof, I have hereunto subscribed my name this 20th day of May, 1926.

JOHN M. SHIMER.